United States Patent
Drost et al.

(10) Patent No.: US 10,018,275 B2
(45) Date of Patent: Jul. 10, 2018

(54) SEALING ARRANGEMENT FOR AN UNDERWATER MOUNTABLE THRUSTER OF A MARINE VESSEL

(71) Applicant: Wartsila Netherlands B.V., Drunen (NL)

(72) Inventors: Albert Drost, Druden (NL); Jeroen Van Loon, Druden (NL); Davor Bilic, Druden (NL); Jan Kees De Bruin, Druden (NL)

(73) Assignee: WÄRTSILÄ NETHERLANDS B.V., Drunen (NL)

( * ) Notice: Subject to any disclaimer, the term of this patent is extended or adjusted under 35 U.S.C. 154(b) by 0 days.

(21) Appl. No.: 15/301,202

(22) PCT Filed: Jun. 9, 2015

(86) PCT No.: PCT/EP2015/062812
§ 371 (c)(1),
(2) Date: Sep. 30, 2016

(87) PCT Pub. No.: WO2016/113000
PCT Pub. Date: Jul. 21, 2016

(65) Prior Publication Data
US 2018/0106380 A1    Apr. 19, 2018

(51) Int. Cl.
*B63H 23/36* (2006.01)
*F16J 15/46* (2006.01)
(Continued)

(52) U.S. Cl.
CPC .............. *F16J 15/46* (2013.01); *B63B 9/00* (2013.01); *B63B 17/0018* (2013.01);
(Continued)

(58) Field of Classification Search
CPC ........ F16J 15/46; B63B 9/00; B63B 17/0018; B63H 20/08
See application file for complete search history.

(56) References Cited

U.S. PATENT DOCUMENTS

| | | | |
|---|---|---|---|
| 4,046,096 A | 9/1977 | Liaaen | |
| 4,586,907 A * | 5/1986 | Florander | B63H 21/30 440/112 |

(Continued)

FOREIGN PATENT DOCUMENTS

| | | |
|---|---|---|
| EP | 0 150 985 A2 | 8/1985 |
| EP | 0 167 503 A1 | 1/1986 |

(Continued)

OTHER PUBLICATIONS

International Search Report for International Application No. PCT/EP2015/062812, dated May 2, 2016.

*Primary Examiner* — Steven P Avila
(74) *Attorney, Agent, or Firm* — Heslin Rothenberg Farley & Mesiti P.C.; Victor A. Cardona, Esq.

(57) ABSTRACT

A sealing arrangement is used when mounting a thruster in a well box attached to a hull of a marine vessel. The well box has an axis, a bottom flange, a top flange, an annular wall therebetween and hoisting pipes fastened parallel with the axis to the bottom flange radially outside the annular wall. Both the well box and a mounting flange have at least one surface acting as a sealing surface between the well box and the thruster. At least one of the surfaces has a groove for a seal for preventing water from entering the well box. The well box has a rotationally symmetric wall with an internal guide surface and the mounting flange of the thruster has an axially extending rotationally symmetric part provided with an outer surface having means for sealing the mounting flange in relation to the well box.

15 Claims, 5 Drawing Sheets

(51) Int. Cl.
*B63B 17/00* (2006.01)
*B63B 9/00* (2006.01)
*B63H 20/04* (2006.01)
B63H 20/02 (2006.01)
B63H 5/125 (2006.01)
B63H 23/32 (2006.01)

(52) U.S. Cl.
CPC ........ *B63H 20/04* (2013.01); *B63B 2009/007* (2013.01); *B63H 23/321* (2013.01); *B63H 2005/1254* (2013.01); *B63H 2020/025* (2013.01)

(56) References Cited

U.S. PATENT DOCUMENTS

| | | | |
|---|---|---|---|
| 4,634,389 A * | 1/1987 | Eptaminitakis | B63B 9/00 440/53 |
| 2009/0166976 A1* | 7/2009 | Rubner-Petersen | B01J 19/0073 277/315 |
| 2013/0036962 A1* | 2/2013 | Van Der Kam | B63B 17/0018 114/268 |

FOREIGN PATENT DOCUMENTS

| | | |
|---|---|---|
| EP | 0 888 962 A2 | 1/1999 |
| FR | 2 338 842 A1 | 8/1977 |

* cited by examiner

SEALING ARRANGEMENT FOR AN UNDERWATER MOUNTABLE THRUSTER OF A MARINE VESSEL

CROSS REFERENCE TO RELATED APPLICATIONS

This application is a national stage of PCT International Application No. PCT/EP2015/062812, filed on Jun. 9, 2015, and published in English on Jul. 21, 2016, as WO 2016/113000 A1, the entire disclosure of this application being hereby incorporated herein by reference.

TECHNICAL FIELD

The present invention relates to a sealing arrangement for an underwater mountable thruster of a marine vessel in accordance with the preamble of claim 1. The present invention also relates to a thruster for a marine vessel.

BACKGROUND ART

Marine vessels use various propulsion systems or units. The main propulsion unit or units is/are normally arranged in the aft part of the ship. The main propulsion unit may be either a fixed propeller arrangement creating a thrust force in the longitudinal direction of the marine vessel, or it may be a pod or a thruster, i.e. a propeller arrangement that may be rotated round a vertical axis.

Normally the pods or thrusters are initially installed from beneath in an opening, so called well, at the hull of the marine vessel when the marine vessel is dry docked, i.e. not yet afloat in water. However, when the pod or thruster needs maintenance or needs to be replaced or modernized, the marine vessel is normally not dry docked but is afloat in water and the thruster is removed by a specific hoisting method and arrangement, which is also used when installing a new or repaired thruster back into the well.

The well at the hull of a prior art marine vessel is provided with a well box, which is welded of its bottom flange or by some other appropriate water-tight manner secured to the bottom of the marine vessel. The well box forms within the hull of a marine vessel a water-tight cavity into which the parts of the thruster located within the hull are fitted. The well box comprises an annular wall with top and bottom flanges, a top cover that is bolted on the top flange of the well box to separate the well box interior from the interior of the hull in an air/water-tight manner for the time of installation of the thruster until the sealing of the thruster keep the water away from the interior of the well box, and three hoisting pipes that are located radially outside the annular wall, on different circumferential positions (for instance spaced 120 degrees from one another) and extend vertically from the well box upwards. The well box comprises further a bottom cover that is bolted to the bottom of the well box to close the well box interior from water. The hoisting pipes are also provided with similar covers outside the perimeter of the bottom cover of the well box.

When a prior art thruster is about to be mounted in the well box, a diver is needed for performing a number of tasks. Firstly, the diver is needed for demounting the covers of the hoisting pipes and for connecting the covers to ropes to avoid the covers from sinking. Next, three hoisting cables are lowered through the hoisting pipes in the water for the diver to attach the cables to brackets of the bottom cover, whereafter the safety bolts fastening the bottom cover may be demounted. Thereafter pressurized air is applied in the interior of the well box to push the bottom cover out. Then, a crane lowers the bottom cover by means of the hoisting cables and a lifting cable from outside the marine vessel is connected by the diver to a single lifting point of the bottom cover. The single lifting cable pulls the bottom cover such that the cable is vertical from the crane, whereafter the hoisting cables that run through the hoisting pipes are disconnected from the bottom cover and the bottom cover is hoisted onto the deck of the vessel by means of the single lifting cable.

Next the prior art thruster to be mounted is coupled to the lifting cable and lowered to water by the crane operating the lifting cable. The three hoisting cables are connected to the thruster, the thruster is drawn by the crane operating the hoisting cables below the hull of the ship and the lifting cable is disconnected by the diver. Thereafter the thruster is lifted by the hoisting cables under the supervision of the diver towards the well box. Simultaneously, the diver checks that the well box is filled with air, and if not instructs the operator to apply pressurized air into the interior of the well box. Thereafter, the diver makes sure the thruster is hanging with its mounting flange horizontally, whereafter the thruster may be lifted into the well box, while the diver monitors that the hoisting cables run properly in the hoisting pipes, the thruster enters the well box correctly and that guide pins in the mounting flange of the thruster enter properly their respective guide openings in the mounting flange of the well box. Next, the driver makes sure the mounting flanges are parallel and, if not, he instructs the operator of the crane to lift or to lower one or two hoisting cables to result in parallel positioning of the mounting flanges. Thereafter, the thruster may be lifted until the mounting flanges meet, and safety bolts may be inserted from inside the hull to secure the thruster against the well box. Thereafter the tightness of the thruster mounting is checked and, if no water is leaking into the well box, the final mounting studs are mounted and tightened to a predetermined tension from inside the hull. Simultaneously, the diver disconnects the hoisting cables from the thruster and mounts the covers of the hoisting pipes by means a number of bolts.

As may be seen from above the diver has a lot of demanding physical tasks to perform in addition to the responsibility of the outcome of the entire mounting operation.

Another weakness in the underwater mounting of a thruster is related to the mechanical construction of the well box, the thruster and their sealing arrangement. The present sealing arrangement of a thruster is formed of a coarse seal and an O-ring seal. Both seals are arranged between the radially extending surfaces of the mounting flanges of the well box and the thruster. The coarse seal is arranged into a groove having a longer radius than that arranged for the O-ring seal. Both grooves are normally in the mounting flange of the thruster. However, the prior art construction of both the coarse seal and the O-ring seal being at the lowermost level of the mounting flange means, in practice, that the coarse seal is used, tightened or compressed only by the above mentioned safety bolts, to confirm whether the sealing leaks or not. This is by no means a reliable way of determining the water tightness of the sealing as even the slightest misalignment between the mounting flange of the thruster and the bottom flange of the well box cause a minor leak even if there is nothing wrong with the actual sealing. Thus, as the water leakage means, in practice, that the thruster has to be lowered and the entire sealing arrangement has to be checked either in water or, at its worst, as lifted out of the water, the whole installation process of the thruster may be repeated without any true cause. In other words, the diver who is responsible for the accuracy of the entire installation should measure the distance between the two flanges and make sure there is not the slightest misalignment between the surfaces. It is not hard to imagine how difficult this task is taken that the waters where the servicing is normally are muddy and thereby far from clear, whereby the risk of not noticing a slight misalignment is great.

In view of the above an object of the present invention is to reduce the need for a diver when dismounting and mounting a thruster of an afloat marine vessel.

Another object of the present invention is to propose a sealing arrangement that is not sensitive to slight misalignment in the installation phase.

Yet another object of the present invention is to improve the sealing between the thruster and the well box.

A further object of the present invention is to propose a mounting flange—well box construction, where there are several guide surfaces ensuring the correct alignment between the mating surfaces of the mounting flange of the thruster and the bottom flange of the well box.

DISCLOSURE OF THE INVENTION

The above and other objects of the invention are met by a sealing arrangement for use when mounting a thruster in a well box attached to a hull of a marine vessel, the well box having an axis, an annular wall and hoisting pipes fastened parallel with the axis radially outside the annular wall and in communication with the annular wall; the thruster having a hub with a propeller and a support housing fastened to the hub and provided with a mounting flange having an axis common with the axis of the well box, when mounted together; both the well box and the mounting flange, when mounted together by means of safety bolts, having at least one pair of sealing surfaces between the well box and the thruster with at least one seal therebetween for preventing water from entering the well box, wherein the well box has a rotationally symmetric wall with an internal guide surface and the mounting flange of the thruster has an axially extending rotationally symmetric part provided with an outer rotationally symmetric surface having means for sealing the mounting flange in relation to the internal guide surface of the well box.

Other characteristic features of the sealing arrangement for an underwater mountable thruster of a marine vessel of the present invention will become apparent from the appended dependent claims.

The present invention, when solving at least one of the above-mentioned problems, also brings about a number of advantages, of which a few has been listed in the following:
- Less critical to misalignment and manufacturing tolerances as the inflatable seal is less sensitive to inaccuracies of the internal well.
- No in situ machining needed which will reduce costs.
- No diver needed to measure the distance between the hull and the mounting flange at various angular positions to check whether the seal is working.
- No separate covers and locking needed to close the bolts holes into which the studs are mounted connecting the well with the thruster.
- Now separate covers for the hoisting pipes.
- Shorter mounting time.

However, it should be understood that the listed advantages are only optional, whereby it depends on the way the invention is put into practice if one or more of the advantages were obtained.

BRIEF DESCRIPTION OF DRAWING

In the following, the sealing arrangement for an underwater mountable thruster of a marine vessel of the present invention is explained in more detail in reference to the accompanying Figures, of which

DETAILED DESCRIPTION OF DRAWING

Figure 1:
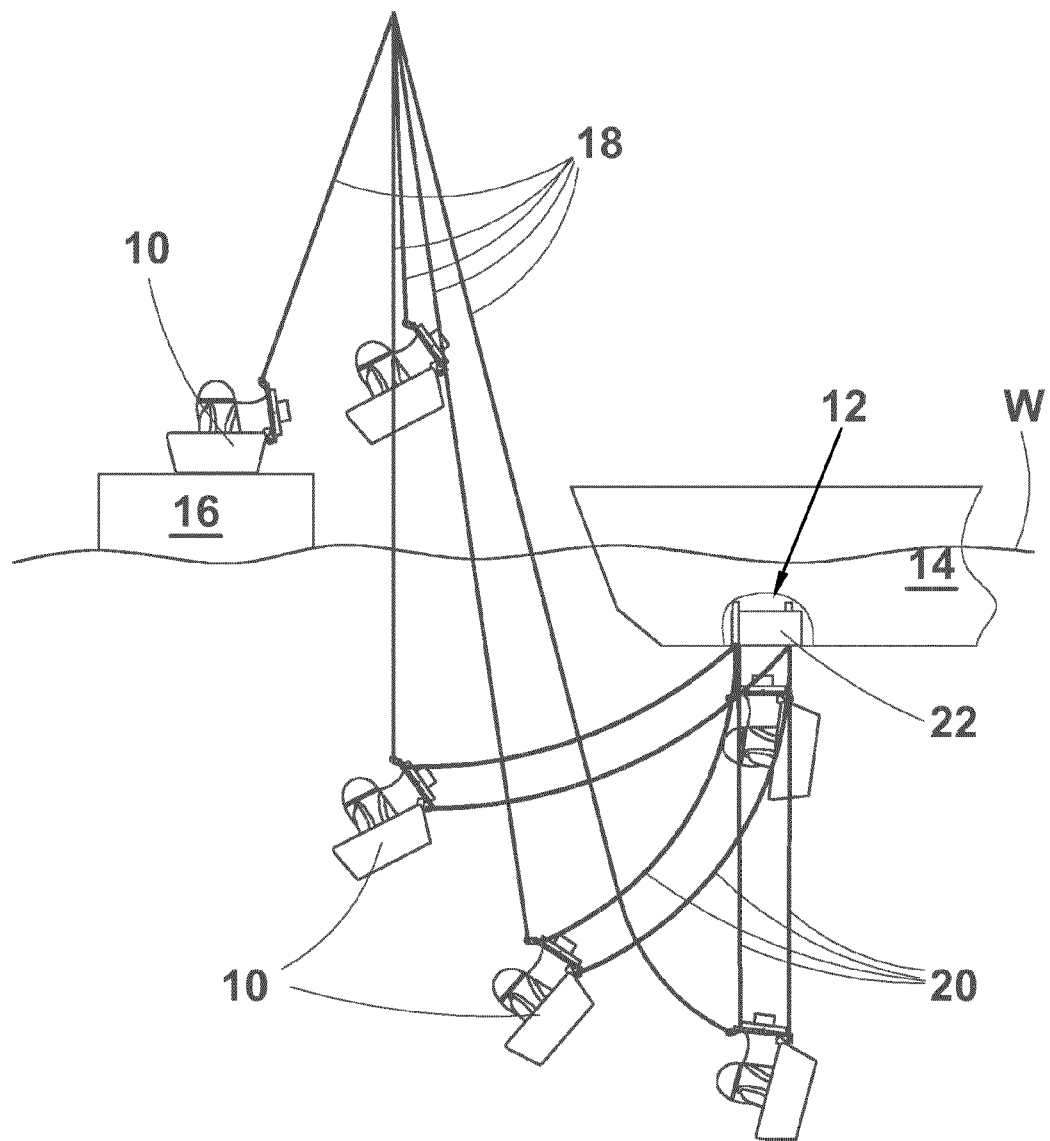
FIG. 1 illustrates the basic principles of a method of underwater mounting of a thruster.

FIG. 1 illustrates the basic principles of a method of underwater mounting of a thruster 10 into a well 12 arranged in the hull 14 of a marine vessel. FIG. 1 shows how a thruster 10 is lifted off the deck of a barge 16 by means of a single lifting cable 18, whereafter three hoisting cables 20 are connected to the thruster 10 either above the water level W or therebelow depending on the length of the hoisting cables 20. Next the thruster 10 is lowered into the water by the lifting cable 18 and drawn below the hull 14 of the marine vessel by slowly tightening the hoisting cables 20. When the thruster 10 is exactly below the well 14 the lifting cable 18 is disconnected and the thruster 10 is lifted by means of the hoisting cables 20 towards the well box 22 arranged in the well 14 in the hull of the marine vessel.

Figure 2:
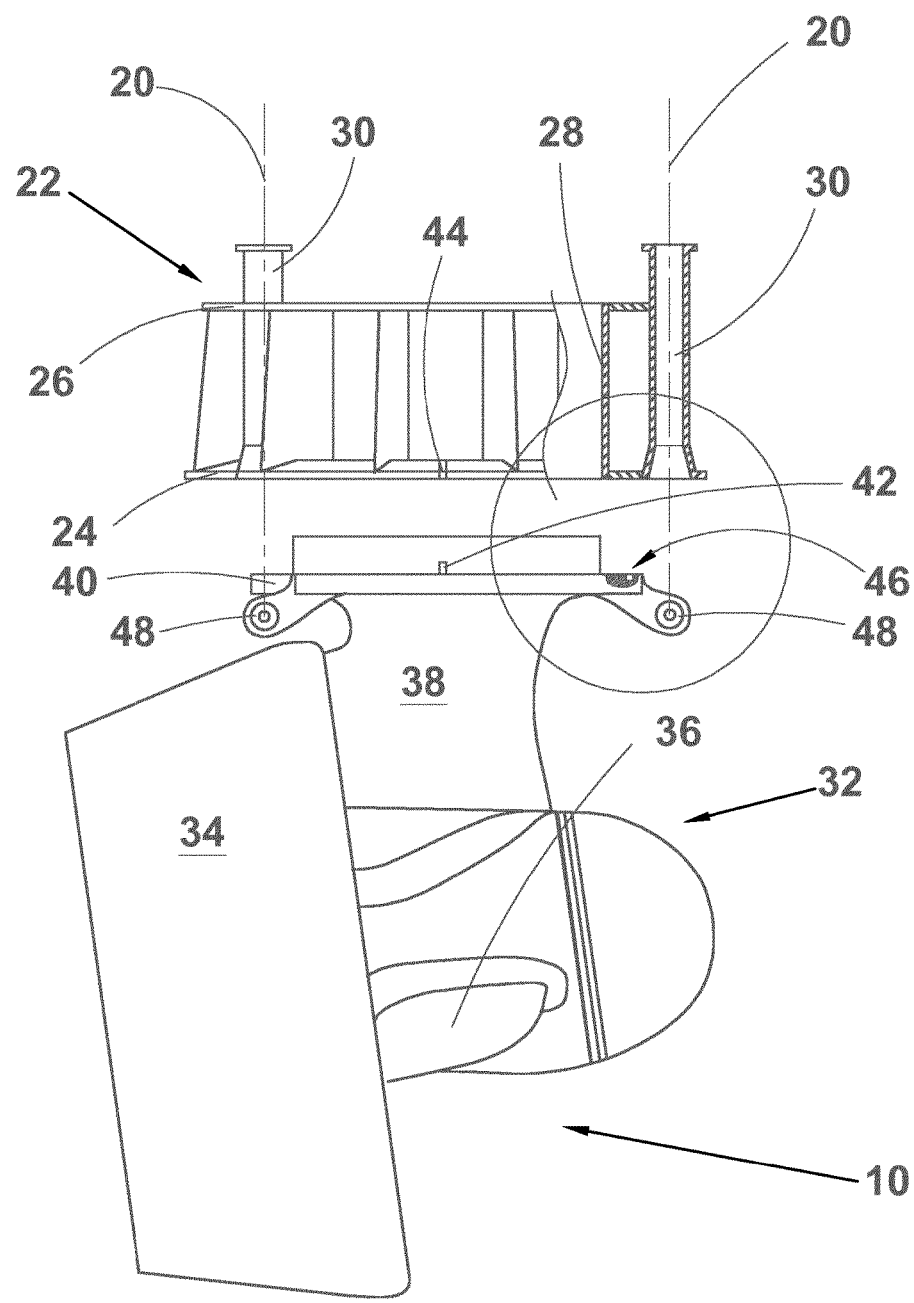
FIG. 2 illustrates a prior art thruster in a position about to be mounted in a prior art well box.

FIG. 2 illustrates the final stage of mounting of the thruster 10 in the well at the hull of the marine vessel. The well in the hull of the marine vessel is provided with a well box 22, which closes the opening in the hull and provides room for the parts of the thruster 10 located within the hull of the marine vessel. The well box 22 is normally welded of its bottom flange 24 to the hull of the marine vessel. The well box 22 comprises an axis A, the above mentioned bottom flange 24, a top flange 26, an annular (preferably but not necessarily cylindrical or slightly conical, i.e. rotationally symmetrical) wall 28 therebetween, the annular wall 28 being arranged between the inner circumferences of the bottom and the top flanges 24 and 26. Additionally, the well box 22 comprises three hoisting pipes 30 located radially outside the annular wall and extending from the bottom flange 24 of the well box 22 vertically upwards. The hoisting pipes 30 are arranged to the circumference of the well box 22 at an angular distance from one another (for instance in an angular distance of 120 degrees from one another).

The thruster 10 comprises a hub 32 with a nozzle 34 and a propeller 36, and a support housing 38 with a mounting flange 40 having an axis common with the axis of the well box A, too, as the well box 22 and the thruster 10 have to be coaxial for proper alignment, when mounting the thruster and the well box to one another. The mounting flange 40 is provided with a number of guide pins 42 (only one is shown) for cooperating with guide openings 44 in the bottom flange 24 of the well box 22 and a number of threaded openings (not shown) for fastening the thruster to the well box 22. Furthermore, the mounting flange 40 is provided with a sealing arrangement 46 for preventing seawater from entering the interior of the well box 22, when the thruster is mounted to the well box 22. The outer perimeter of the mounting flange 40 is provided with brackets 48 positioned to the circumference of the mounting flange 40 at an angular distance (for instance 120 degrees) from one another in the manner of the hoisting pipes of the well box 22 so that hoisting cables 20 (shown by broken lines) may be connected to the brackets 48 and the hoisting cables 20, when pulling the thruster upwards, guide, on their part, the thruster 10 into the well box 22. The final proper positioning of the thruster 10 is ensured by the guide pins 42 of the mounting flange 40 cooperating with corresponding holes 44 in the bottom flange 24 of the well box 22.

Figure 3:
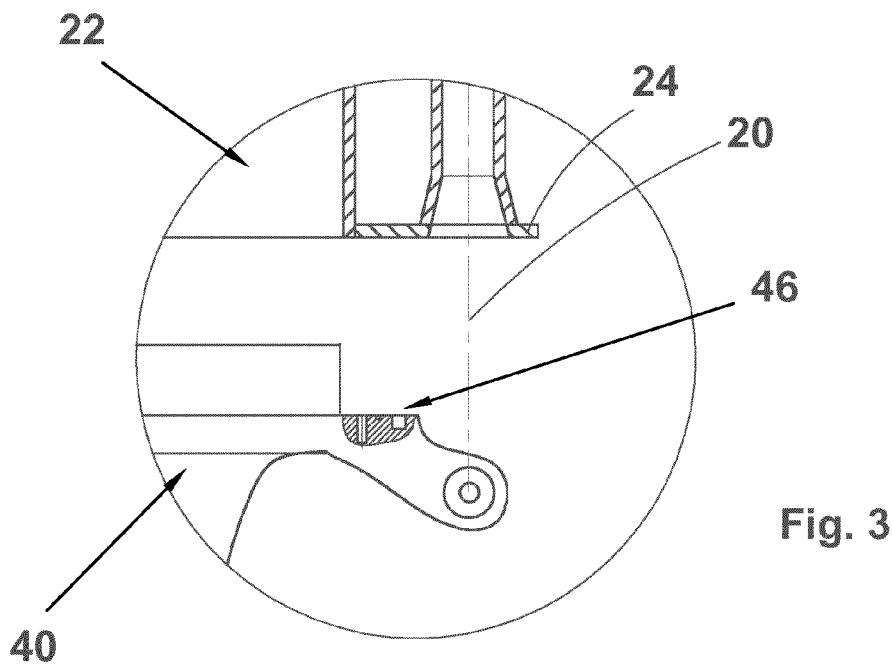
FIG. 3 illustrates an enlarged partial view of FIG. 2.
Figure 4:
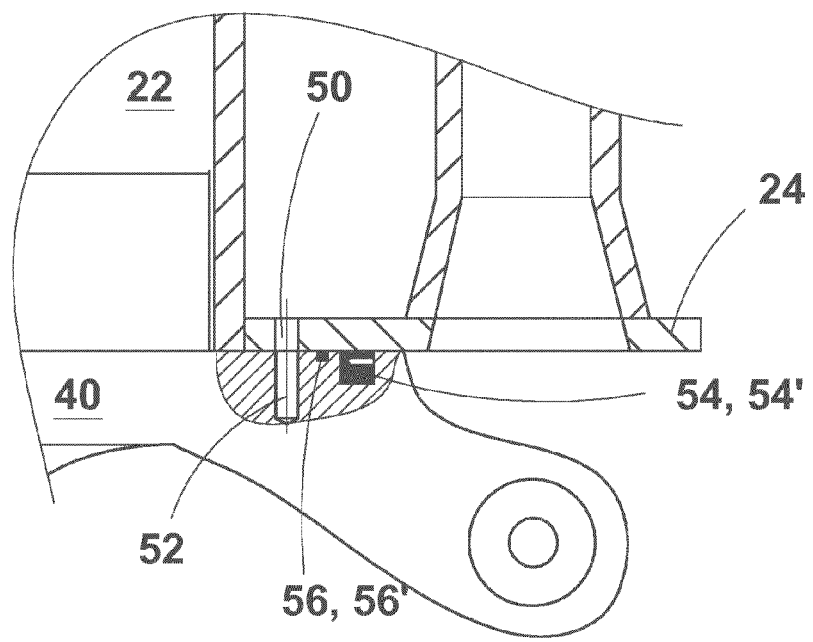
FIG. 4 illustrates the thruster mounted in the well box in an enlarged partial view.

FIGS. 3 and 4 illustrate two enlarged partial views of the prior art well box and the mounting flange of the prior art thruster. In FIG. 3 the well box 22 and the mounting flange 40 are at a distance from one another and in FIG. 4 the mounting flange 40 of the thruster is positioned against the bottom flange 24 of the well box 22. FIG. 4 shows a hole (of a series of holes) 50 in the bottom flange 24 of the well box 22 and a threaded hole (of a series of threaded holes) 52 in the mounting flange 40 of the thruster. When the hoisting cables 20 have pulled the flanges 40 and 24 one against the other a few safety bolts are screwed into the threaded holes 52 for checking the tightness of the sealing. When the sealing is considered to be tight further studs (not shown are threaded in the remaining threaded holes 52 and the flanges 24 and 40 are tightened to a pretension force against one another by ordinary nuts or by using a hydraulic tensioner.

The sealing 46 between the two flanges 40 and 24 is arranged by means of a coarse seal 54 and an O-ring seal 56, both arranged in their respective grooves 54' and 56' in the mounting flange 40 of the thruster. The groove 56' for the O-ring 56 having a smaller diameter than that 54' of the coarse seal 54. The coarse seal 56 is a lip-type seal, which operates such that the lip is positioned in an inclined position such that the tip of the lip is above or outside the level of the mounting flange 40 when the two flanges 24 and 40 are at a distance from one another. When the flanges 24 and 40 are brought closer to each other the bottom flange 24 of the well box 22 bends the lip down and thus compresses the coarse seal 54. As discussed already earlier the lip of the coarse seal does not allow much misalignment, whereby the installation of the thruster has to be performed with utmost care, which may be a challenging task in less clear muddy waters of a port where the installation needs to be made.

In addition to the problems relating to the use of a diver in various tasks when mounting or demounting the thruster the construction of the well box causes additional work and a clear risk of flooding the hull of the marine vessel with seawater. A problem area is the holes 50 in the bottom flange 24 of the well box 22. As is apparent from the Figures the holes 50 are outside the substantially vertical annular wall 28 of the well box, i.e. the holes 50 open in the hull of the marine vessel. This is naturally an advantageous feature in view of mounting and tensioning the studs, as it is easy to insert the studs in holes 50 and 52 and to pretension such via the space around the well box 22. However, it has to be understood that the holes 50 open a free access of seawater into the hull of the marine vessel. Therefore, each time a well cover or a thruster is demounted from the well box 22, each one of the holes 50 has to be blocked by means of a plug right after the stud or safety bolt is removed from the hole. The plugs not only increase the work needed in the hull, but also form a clear risk, as one or more plugs may open and allow water to flow into the hull. Therefore, a novel construction of a well box is desired, too.

Figure 5:
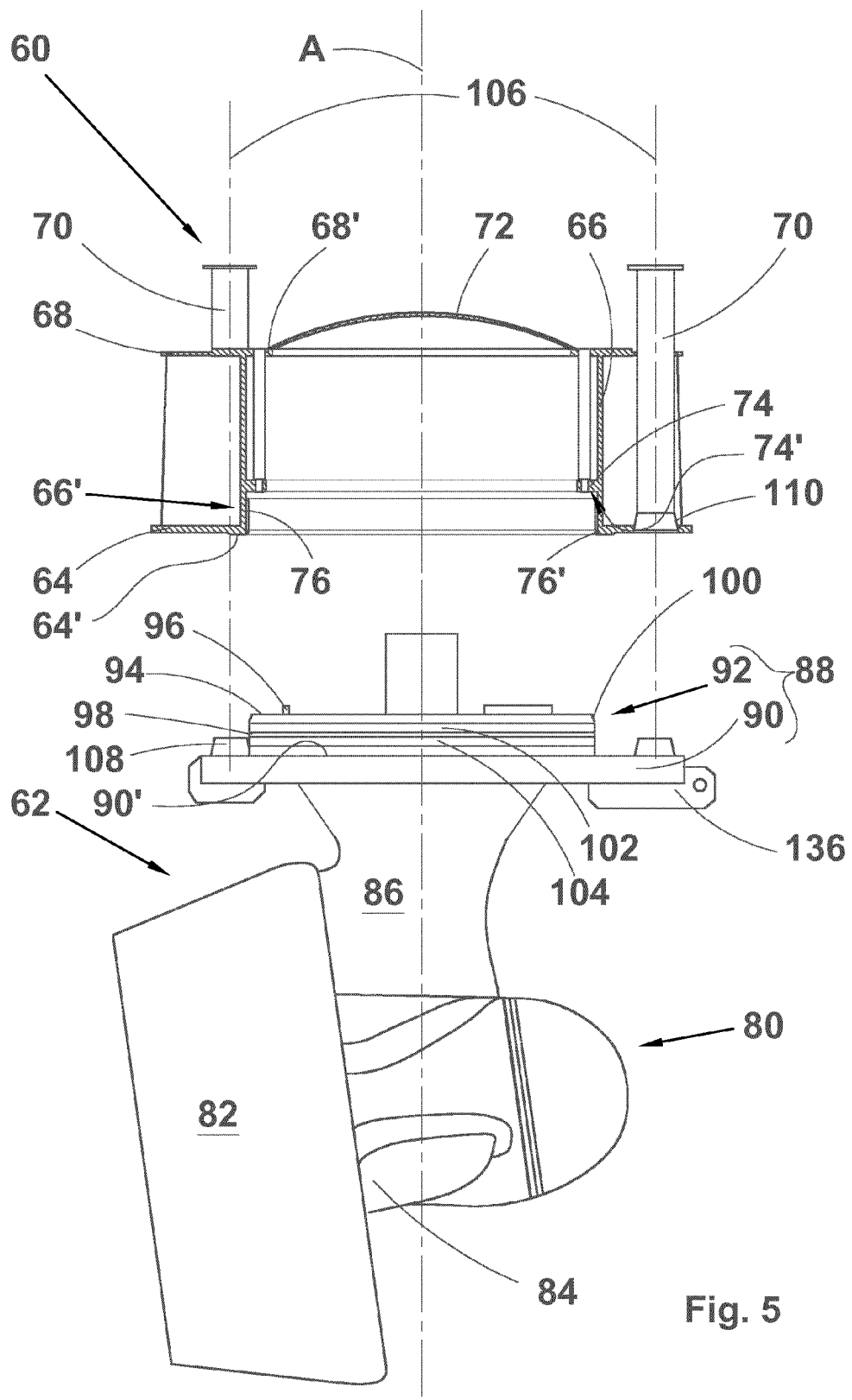
FIG. 5 illustrates the thruster and the well box in accordance with the present invention.

FIG. 5 illustrates schematically the well box 60 and the thruster 62 applying the sealing arrangement of the present invention. The well box 60 of the present invention comprises an axis A, a bottom flange 64, a rotationally symmetric, i.e. a cylindrical or a slightly conical, wall 66 fastened at its lower end to the inner circumference of the bottom flange 64, a top flange 68 fastened to the upper end of the rotationally symmetric wall 66, three hoisting pipes 70 attached to the bottom flange 64 radially outside the rotationally symmetric wall 66 and a top cover 72 closing the interior of the well box 60 in relation to the hull. The top flange 68 extends radially, i.e. towards the axis A, inside the rotationally symmetric wall 66 such that the diameter of the top cover 72 fastened to the top flange 68 is smaller than that of the rotationally symmetric wall 66. The radially inwardly extending portion of the top flange 68 is given a reference numeral 68'. The rotationally symmetric wall 66 is provided, at a distance from the lower end thereof, a radially inwardly, i.e. towards the axis A, extending flange 74. Both the radially inwardly extending flange portion 68' of the top flange 68 and the lower radially inwardly extending flange 74 are provided with a series of openings arranged one above the other such that vertical pipes and safety bolts may be pushed therethrough (see in more detail FIG. 6). The rotationally symmetric wall 66 is at its lower wall part 66', i.e. below the radially inwardly extending flange 74 provided with a guide means or guide surface 76 having a tapered, conical surface part 76' at its lower end, i.e. the end facing away from the radially inwardly extending flange 74 for guiding the thruster inside the well box 60. The guide surface 76 is preferably, but not necessarily, made of a specific material, like stainless steel, having advantageous friction and sealing properties.

The thruster 62 comprises a hub 80 with a nozzle 82 and a propeller 84, and a support housing 86 with a mounting flange 88 having an axis A common with the well box 60. The mounting flange 88 is provided, in addition to the radially, i.e. at right angles to the axis A, extending flange part 90, with an axially upwardly, or in a direction away from the hub 80 extending rotationally symmetric part 92. The rotationally symmetric part 92 has a height corresponding to the height of the lower wall part 66' of the rotationally symmetric wall 66 of the well box 60. The substantially radial end face 94 of the rotationally symmetric part 92 is provided with at least one, preferably a number of guide pins 96 (only one is shown) for cooperating with guide openings (not shown) in the surface 74' (facing out of the well box) of the inwardly extending flange 74 of the rotationally symmetric wall 66 of the well box 60 (naturally, corresponding pin/s may be located in the surface 74' of the inwardly extending flange of the rotationally symmetric wall of the well box and the guide opening/s in the end face of the rotationally symmetric part) and a number of threaded openings (not shown) for fastening the thruster 62 to the well box 60. As to the end face 94 and the surface 74' of the inwardly extending flange 74 they are preferably radial, i.e. in a plane at right angles to the axis A, but their direction may also deviate from radial as long as the two surfaces are parallel. The upper end of the rotationally symmetric outer surface 98 of the axially extending rotationally symmetric part 92 is, at its upper radially outer edge, provided with a taper 100 such that the taper 100 guides the mounting flange 88 inside the well box 60 in cooperation with the with the tapered, conical surface part 76' of the guide surface 76 of the well box. The rotationally symmetric outer surface 98 of the axially extending rotationally symmetric part 92 is provided with means for sealing the gap between itself and guide surface 76 of the well box 60 for the time the actual fastening of the thruster 62 to the well box 60 takes. The sealing means are arranged in grooves 102 and 104 running circumferentially round the rotationally symmetric outer surface 98. As to the outer surface 98 of the axially extending part 92, as well as its counter surface or guide surface 76 in the well box 60, it should be understood that the rotationally symmetric surfaces 98 and 76 may be either cylindrical or slightly conical as long as they are substantially parallel with one another.

The radially extending flange part 90 is, radially outside the axially extending rotationally symmetric part 92, provided with means, brackets or the like, for connecting the hoisting cables 106 (shown as broken lines) to the mounting flange 88. The connecting means are arranged in connection with upwardly tapering guide means 108, which are used on their part for guiding the thruster mounting flange 88 properly in communication with the well box 60. In other words, the mounting of the thruster 62 takes place as follows. When the thruster 62 is lifted upwards, first the hoisting cables 106 running in the hoisting pipes 70 guide the thruster 62 and its mounting flange 88 vertically upwards, i.e. towards the well box 60, secondly, the tapered surface part 76' of the guide surface 76 of the well box 60 and the corresponding taper 100 in the axially extending part 92 of the mounting flange 88 guide the thruster 62 more closely inside the well box 60, next the tapered guide means 108 in connection with the connecting means cooperate with the lower conical part 110 of the hoisting pipes 70 and center the thruster mounting flange 88 such that the final positioning with the guide pins 96 and guide openings will take place reliably and problem-free. By entering into the hoisting pipes 70 the tapered guide means 108 also close the hoisting pipes 70 such that no separate closing plates at the bottom of the hoisting pipes in the manner of prior art construction are needed.

Figure 6:
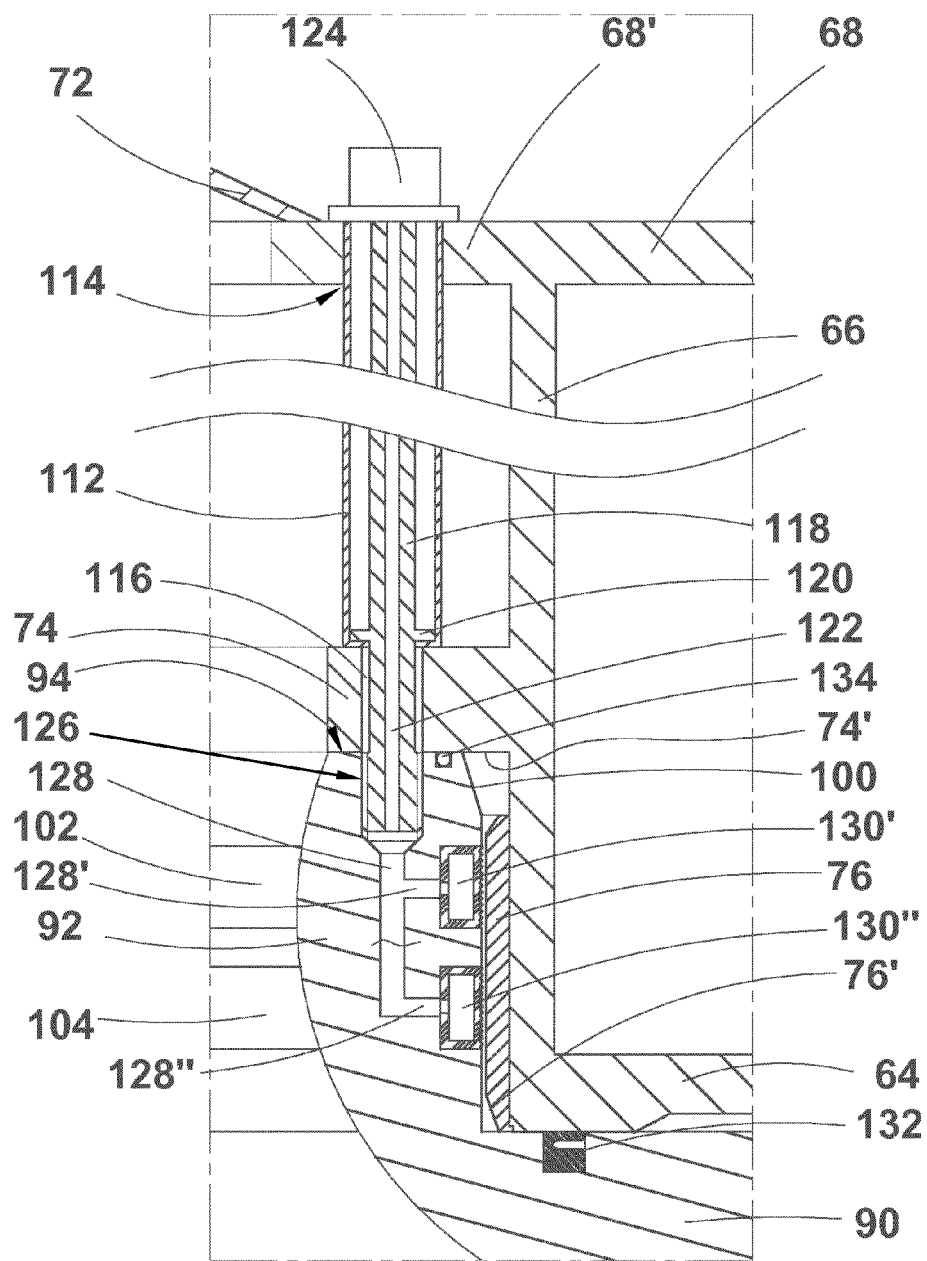
FIG. 6 illustrates a partial enlarged view of the thruster—well box combination when the thruster mounting flange is lifted in communication with the well box.

FIG. 6 illustrates a partial enlarged view of the thruster—well box combination when the thruster mounting flange is lifted in communication with the well box 60. First of all, FIG. 6 shows that a tube 112 provided with a hole at its bottom is arranged and sealed in the hole 114 in the radially inwardly extending flange portion 68' of the top flange 68 of the well box 60. The tube 112 extends down on the inwardly extending flange 74 of the wall 66 such that the hole in the bottom of the tube 112 is aligned with the hole 116 in the inwardly extending flange 74. In other words, holes 114 and 116 are coaxial and parallel with the axis A of the well box 60. The tube 112 is also sealed with the inwardly extending flange 74. In accordance with a preferred embodiment of the invention the tube 112 is welded to both the radially inwardly extending flange portion 68' of the top flange 68 and the inwardly extending flange 74. The tube 112 is needed for a safety bolt 118 that is arranged to extend via the tube 112 in the hole 116 in the inwardly extending flange 74 of the wall 66 of the well box 60. In other words, by means of the tube 112 the hole 114 in the radially inwardly extending flange portion 68' of the top flange 68 is closed so that any flow from the interior of the well box to the hull of the marine vessel via the hole 114 is prevented. The safety bolt or bolts 118 have two specific functions, i.e. firstly, they are used to draw the thruster sealing surface/s against those of the well box. The second function will be explained later on. The end of the safety bolt 118 extending into the hole 116 is provided with a thread. The safety bolt 118 is provided with a flange part 120 located within the tube 112 and sealing the safety bolt 118 in relation to the inner surface of the tube 112. The safety bolt 118 is further provided with an axial flow channel 122 and a valve means 124 connecting the channel in the pressure medium source, the valve means 124 being, for instance, arranged at the upper end of the safety bolt 118, i.e. at the end of the safety bolt 118 away from the threaded end thereof. In other words, the safety bolt 118 is hollow. The safety bolts 118, preferably, but not necessarily, in total of two to six safety bolts, are arranged at equal intervals on the circumference of the well box 60 so that the sealing is equally compressed from all around the well box. Additionally, the number of holes 114 in the radially inwardly extending flange portion 68' of the top flange 68 and the number of tubes 112 equal with the number of safety bolts 118.

FIG. 6 shows also the axially extending part 92 of the mounting flange having a taper 100, and the cooperating tapering surface part 76' in the inner surface 76 of the well box. The end face 94 of the axially extending part 92 of the mounting flange is provided with an opening for a threaded hole 126. As already mentioned in connection with FIG. 5 the outer surface of the axially extending part of the mounting flange is provided with grooves 102 and 104 for sealing means. The grooves 102 and 104 are arranged via channels 128' and 128" in flow communication with the threaded hole 126 by means of a further channel 128. The sealing means in the grooves 102 and 104 are inflatable seals 130' and 130" arranged in communication with the channels 128' and 128", respectively, and channel 128 in the mounting flange with the channel 122 in the safety bolt 118 when the safety bolt 118 is screwed in the threaded hole 126 in the axially extending part 92 of the mounting flange. In other words, the second function of at least one of the safety bolts 118 (as will be discussed later on) is to provide a fluid flow passage from the hull cavity of the marine vessel to the thruster mounting flange and to the inflatable seals for pressurizing and depressurizing the seals. In accordance with one embodiment of the present invention only one safety bolt 118 needs to be provided with the axial flow channel 122 and the valve means 124, and, correspondingly, only one threaded hole 126 needs to be continued as flow channels 128, 128' and 128". In other words, filling and emptying of the inflatable seals 130' and 130" take place along the same channel 122 in the single hollow safety bolt by, for instance, coupling the valve means between a position connecting the channel 122 to the pressurized air source and a position connecting the channel 122 to atmosphere. In accordance with another embodiment of the present invention there are two hollow safety bolts, one for providing seal 130' with air and another for providing seal 130" with air, whereby the air cavities of the seals 130' and 130" are not in flow communication with each other. In accordance with an optional embodiment of the present invention the two safety bolts are arranged such that one safety bolt provides both inflatable seals with air and the other is used for allowing the air discharge from the seals, whereby the seals and channels may be flushed with air. In accordance with an advantageous embodiment of the present invention there are in total four hollow safety bolts, one pair for providing the seal 130' with air and for allowing air to escape the seal 130' and another pair for providing the seal 130" with air and for allowing air to escape the seal 130". Thus the seals 130' and 130" may be filled, emptied and flushed individually by using the last one of the above embodiments. As to locating the safety bolts 118 of the last three embodiments it is advantageous to arrange the safety bolt used for discharging air from the seal 180 degrees apart from the safety bolt used for introducing air to the seal. As to the valve means 124, such are needed in communication with each safety bolt provided with the flow channel 122 and used either for introducing air in or discharging air out of the inflatable seals.

FIG. 6 further shows also the seals that seal the interior of the well box from seawater when thruster installation has ended and the marine vessel is sailing, i.e. the coarse seal 132, which is arranged in a groove in the radially outwardly extending flange part 90 of the mounting flange between the surface 90' (see FIG. 5) of the mounting flange 88 and the seal surface 64' (see FIG. 5) of the bottom flange 64 of the well box 60, and an O-ring seal 134 arranged in a groove at the end face or surface 94 of the axially extending part 92 of the mounting flange between the end face 94 and the surface 74' (see FIG. 5) of the inwardly extending flange 74 of the wall 66 of the well box.

Now, referring to FIGS. 1 (showing the general principle) 5 and 6, the underwater mounting of the (steerable) thruster 62 takes place as follows.

The interior of the well box 60 is filled with pressurized air via an air channel connected to the well box 60 or its top cover 72 for preventing the entrance of water into the well box 60.

The thruster 10 (located on the deck of a barge or the marine vessel or on some appropriate land structure) is connected of its bracket 136 to a single cable, lifted and lowered into the water.

Hoisting cables 106 are lowered through the hoisting pipes 70 and connected to the connecting means on the mounting flange 88 of the thruster 62. The connection used between the cables 106 and the mounting flange may, for instance, be a bullet-latch connection. If the hoisting cables 106 are long enough they may be connected to the thruster 62 already when the thruster 62 is on the deck or above the sea level.

The hoisting cables 106 running through the hoisting pipes 70 pull the thruster 62 to a position right under the well.

The cable for single point lifting is disconnected.

The thruster 62 is hoisted into the well by the hoisting cables 106 running through the hoisting pipes 70.

The position of the thruster 62 with its mounting flange 88 against the bottom flange 64 and the inwardly extending flange 74 of the well box 60 is determined, for instance by notifying an increase in the load in the hoisting cables or visually by means of a pin indicator in the top cover 72 popping up when the thruster is fully mounted.

Safety bolts 118 are taken via tubes 112 and fastened in threaded holes 126 to lock the thruster 62 in place.

Inflatable seals 130 are inflated by opening the valve 124 and allowing pressure medium flow through the channel 122 in at least one hollow safety bolt 118 into channels 128 and 128' in the mounting flange and further on into the inflatable seals 130.

Compressed air above the thruster 62 in the interior of the well box 60 is allowed to bleed out of the well box 60. If water is able to enter the well box 60, then the seals 130 are leaking and the mounting will have to be re-done. An advantageous way of detecting leakage is to provide at least one of mating surfaces 94 and 74' with an annular groove such that holes 116 and 126 open in the groove, whereby a tube like tube 112 may be used to bring the leakage water, preferably via a valve outside the well box to be observed.

When it is substantiated that the seals 130 are watertight the top cover 72 may be removed.

All additional studs (bolts) holding the thruster 62 in place during operations can be fastened fixing the thruster 62 firmly into place activating both O-ring seal 134 and the coarse seal 132. Each additional stud extends from the threaded hole 126 in the rotationally symmetric part 92 through the inwardly extending flange 74 above the flange such that a fastening means (ordinary nut or a hydraulic tensioner) may be arranged at the top end of the stud. In other words, the studs use the same holes 116 of the circumferential array of holes 126 in the inwardly extending flange 74 and the same threaded holes 126 of the circumferential array of holes 126 in the mounting flange 88 as the safety bolts 118. And, as is evident from the above specification and the appended drawings, the studs are tensioned from inside the well box, i.e. contrary to the prior art arrangement discussed in FIGS. 2-4.

Inflatable seals 130 are deflated.

Hoisting cables 106 are disconnected from the mounting flange 88 and removed from the hoisting pipes 70

The underwater dismounting of the steerable thruster takes place as follows.
1. Inflatable seals 130 are inflated.
2. Hoisting cables 106 are lowered into the hoisting pipes 70 and connected to the mounting flange 88 of the thruster 62 (possibly by means of a bullet-latch connection).
3. Standard studs (bolts) are demounted (except for the safety bolts 118).
4. Top cover 72 is mounted onto the well box 60.
5. The cavity in the well box 60 in between the top cover 72 and the thruster 62 is filled with pressurized air.
6. The inflatable seals 130 are deflated.
7. The safety bolts 118 are unfastened.
8. The hoisting cables 106 running through the hoisting pipes 70 lower the thruster 62 to a position under the well box 60.
9. The cable for single point lifting is connected to its bracket 136 in the mounting flange 88.
10. The single point lifting cable pulls the thruster 62 such that this cable is vertical from the crane.
11. The three cables 106 running through the hoisting pipes 70 are disconnected.
12. The thruster 62 is lifted out of the water on the deck of the vessel or a barge or on land.

As may be seen from above the mounting and dismounting of the thruster may be performed almost without any active involvement of a diver. In fact, the diver is needed only for connecting and disconnecting the cables to and from the mounting flange. There are no covers that the diver would need to mount or dismount or the diver is not needed for ensuring proper alignment of the mounting flange and the well box.

It should be understood that the above is only an exemplary description of a novel and inventive thruster—well box combination. It should be understood that though the specification above discusses a certain type of a thruster, the type of the thruster does not limit the invention to the types discussed. Thus it is clear that the drive of the propeller may be arranged not only by mechanical gear and shaft drive but also by means of an electric or a hydraulic motor arranged down in the hub. It is also clear that as the pressure medium not only air is applicable but also other gases or fluids may be used, taking into account that when using pressure medium other than air, it should preferably be collected, when being discharged from the seals, instead of allowing such to escape into atmosphere. The above explanation should not be understood as limiting the invention by any means but the entire scope of the invention is defined by the appended claims only. From the above description it should be understood that separate features of the invention may be used in connection with other separate features even if such a combination has not been specifically shown or discussed in the description or in the drawings.

The invention claimed is:

1. A sealing arrangement for use when mounting a thruster in a well box attached to a hull of a marine vessel, comprising:
    the well box having an axis, an annular wall and hoisting pipes fastened parallel with the axis radially outside the annular wall in communication with the annular wall;
    the thruster having a hub with a propeller and a support housing fastened to the hub and provided with a mounting flange having an axis common with the axis of the well box, when mounted together;
    both the well box and the mounting flange, when mounted together by means of safety bolts, having at least one pair of sealing surfaces between the well box and the thruster, with at least one seal therebetween for preventing water from entering the well box; and
    the well box having a rotationally symmetric wall with an internal guide surface and the mounting flange of the thruster having an axially extending rotationally symmetric part provided with an outer rotationally symmetric surface having means for sealing the mounting flange in relation to the internal guide surface of the well box.

2. The sealing arrangement as recited in claim 1, wherein the means for sealing the mounting flange in relation to the well box is at least one groove in the surface and an inflatable seal arranged therein.

3. The sealing arrangement as recited in claim 2, further comprising, channels in the mounting flange and a channel in the safety bolt for pressurizing and depressurizing the inflatable seal.

4. The sealing arrangement as recited in claim 3, further comprising at least one safety bolt for introducing pressure medium in the inflatable seal and at least one safety bolt for discharging pressure medium therefrom.

5. The sealing arrangement as recited in claim 3, further comprising a valve means at an end of the safety bolt connecting the channel either to the source of pressure medium or to atmosphere.

6. The sealing arrangement as recited in claim 1, wherein the well box has a radially inwardly extending flange part at an end of the annular wall opposite to the internal guide surface and the annular wall of the well box has an inwardly extending flange, the radially inwardly extending part having holes and the inwardly extending flange having holes, the holes and being coaxial and parallel with the axis of the well box.

7. The sealing arrangement as recited in claim 6, further comprising a tube arranged between the radially inwardly extending part and the inwardly extending flange and aligned with the holes.

8. The sealing arrangement as recited in claim 7, wherein the tube is sealed in relation to the hole.

9. The sealing arrangement as recited in claim 8, wherein the safety bolt is sealed in relation to the tube by means of a radially outwardly extending flange.

10. The sealing arrangement as recited in claim 6, further comprising a surface of the inwardly extending flange and the end face of the axially extending rotationally symmetric part forming a pair of cooperating sealing surfaces, one of the surfaces having a groove for an O-ring seal.

11. The sealing arrangement as recited in claim 6, wherein the annular wall has a radially outwardly extending bottom flange at an end of the annular wall opposite the radially inwardly extending flange part and that a surface of the bottom flange and a top surface of the mounting flange form another pair of cooperating sealing surfaces, one of the surfaces having a groove for a coarse seal.

12. The sealing arrangement as recited in claim 1, wherein the internal guide surface of the well box is a separate element fastened on the rotational symmetric wall of the well box.

13. The sealing arrangement as recited in claim 1, wherein the guide surface has a tapered surface part and the outer rotationally symmetric surface of the axially extending rotationally symmetric part having a taper.

14. A thruster for a marine vessel, comprising:
    a hub with a propeller and a support housing fastened to the hub and provided with a mounting flange having an axis;
    the mounting flange having threaded holes and at least one sealing surface; and
    the mounting flange having an axially extending rotationally symmetric part provided with an outer rotationally symmetric surface having means for sealing the mounting flange.

15. The thruster as recited in claim 14, further comprising at least one groove in the rotationally symmetric surface and an inflatable seal arranged therein.

\* \* \* \* \*